United States Patent [19]

Han et al.

[11] Patent Number: 5,633,911
[45] Date of Patent: May 27, 1997

[54] METHOD AND APPARATUS FOR RESERVING A TELEPHONE LINE IN A TELEPOINT COMMUNICATION SYSTEM

[75] Inventors: Wen K. Han; See W. Ng, both of Singapore, Singapore; Prashanth M. L. Gowda, Fortworth, Tex.

[73] Assignee: Motorola, Inc., Schaumburg, Ill.

[21] Appl. No.: 376,726

[22] Filed: Jan. 23, 1995

[51] Int. Cl.$^6$ .................................................. H04Q 7/20
[52] U.S. Cl. ............................... 379/58; 379/63; 379/61
[58] Field of Search ................................ 379/58, 59, 60, 379/61, 266, 309; 455/33.1, 33.2, 34.1, 34.2, 54.1

[56] References Cited

U.S. PATENT DOCUMENTS

| | | | |
|---|---|---|---|
| 4,977,589 | 12/1990 | Johnson et al. | 379/58 |
| 5,189,734 | 2/1993 | Bailey et al. | 455/33.2 |
| 5,226,071 | 7/1993 | Bolliger et al. | 379/60 |
| 5,509,053 | 4/1996 | Gowda et al. | 379/63 |

*Primary Examiner*—Curtis Kuntz
*Assistant Examiner*—G. J. Oehling
*Attorney, Agent, or Firm*—Darleen J. Stockley; Daniel R. Collopy

[57] ABSTRACT

A telepoint communication system 100 where the telepoint communication unit (TCU) 125 reserves a communication channel on the communication link 126, where the communication link 126 couples the telepoint base station (TBS) 110 to the public switched telephone network (PSTN) 105. Reserving the communication channel is accomplished by communicating information packets 130,133,136,140,143 and 146 between the TCU 125 and the TBS 110. Reserving the communication channel enables the TCU 125 to ensure the reserved communication is available to route incoming calls received on the telepoint communication system 100 to the TCU 125, particularly when an incoming call is expected.

11 Claims, 4 Drawing Sheets

METHOD AND APPARATUS FOR RESERVING A TELEPHONE LINE IN A TELEPOINT COMMUNICATION SYSTEM

FIELD OF THE INVENTION

The invention relates in general to telepoint communication systems, and in particular to a method and apparatus for reserving a communication channel coupling a base station of a telepoint communication system to a public switched telephone network.

BACKGROUND OF THE INVENTION

Telepoint communication systems that provide one way calling are well known in the art, and recently, telepoint communication systems which provide two way calling have been developed. Typically, in a telepoint communication system that provides two way calling, a telepoint communication unit (TCU) has to be registered with a telepoint base station (TBS) in order for the TCU to receive an incoming call. Conventionally, a TBS is coupled to a public switched telephone network (PSTN) via one or more basic rate interfaces (BRI) which support a number of communication channels. Conventionally, the number of TCUs that may register with a TBS is significantly larger than the number of communication channels supported by the TBS, hence, circumstances may occur when a TCU registered with a TBS is not able to receive an incoming call as every communication channel of the TBS is engaged in an incoming, or an outgoing call. When such circumstances occur, the TCU subscriber is unaware that an incoming call could not be completed successfully, and when urgent or important communication is expected, the TCU subscriber would risk being uncontactable.

Hence, a need exists for a method that substantially improves the probability of a subscriber receiving incoming calls in a telepoint communication system, particularly when an incoming call is expected by the subscriber. In addition, it is preferable that the method require minimum change when implemented in current telepoint communication systems.

SUMMARY OF THE INVENTION

In carrying out the objects of the present invention in one form, there is provided a method and apparatus for reserving a communication channel that couples a TBS to a PSTN.

In carrying out the objects of the present invention in another form, there is provided a method and apparatus which enables a TBS to reserve a communication channel that couples the TBS to a PSTN.

In carrying out the objects of the present invention in yet another form, there is provided a method and apparatus for a TCU to have a TBS reserve a communication channel of the TBS for exclusive use by the TCU.

DETAILED DESCRIPTION OF THE INVENTION

Figure 1:
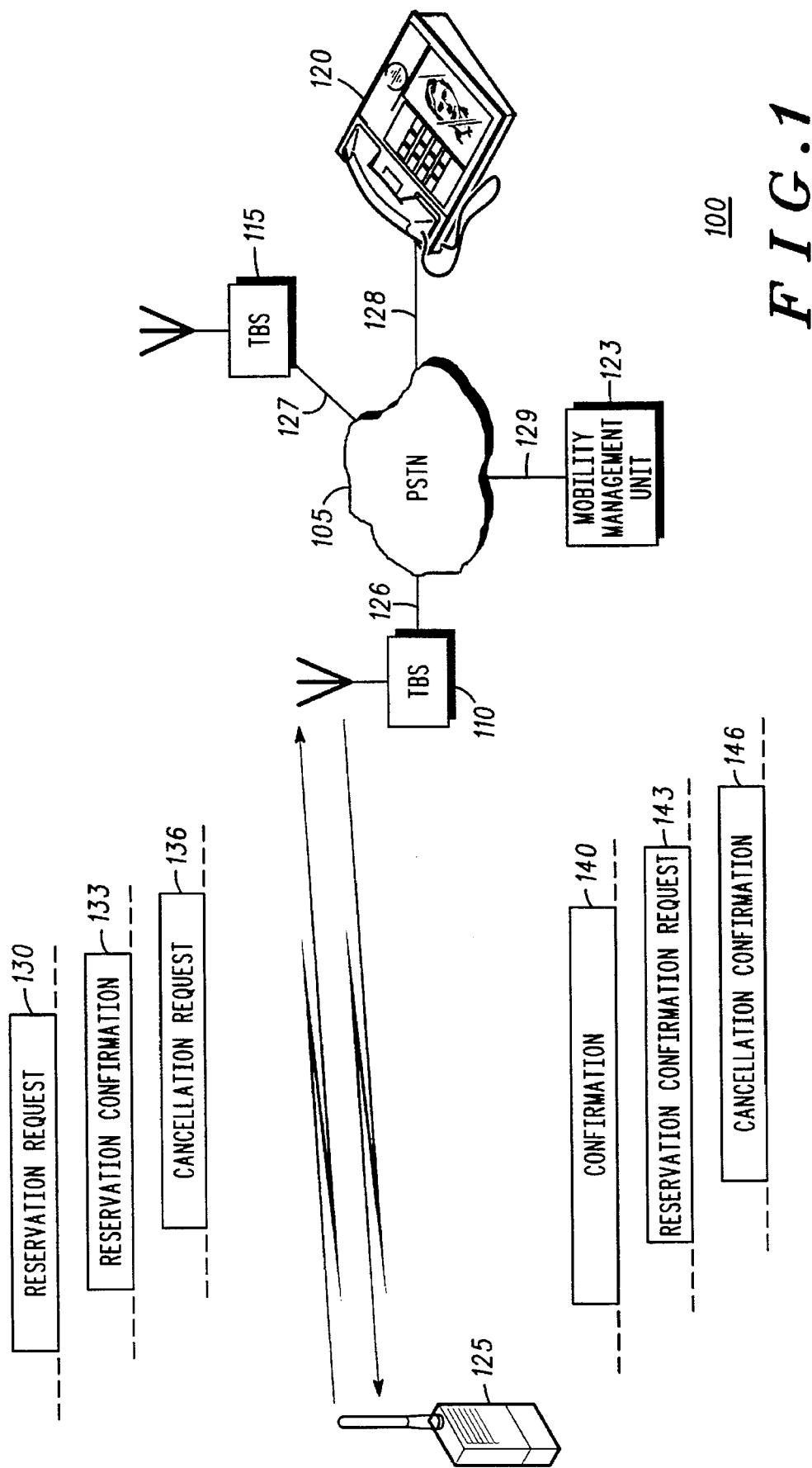
FIG. 1 illustrates a telepoint communication system in accordance with a preferred embodiment of the present invention.

FIG. 1 illustrates a telepoint communication system 100 comprising a public switched telephone network (PSTN) 105, that preferably supports integrated services digital network (ISDN) in accordance with a preferred embodiment of the present invention, telepoint base stations (TBS) 110 & 115, telephone subscriber unit 120, mobility management unit (MMU) 123, and telepoint communication unit (TCU) 125. The TBSs 110 & 115 are coupled to the PSTN 105 via communication links 126 and 127 respectively, and each communication link 126 and 127 may comprise one or more basic rate interfaces (BRI), where each BRI can simultaneously support two communication channels as defined by the Integrated Services Digital Network (ISDN) specifications. It is understood that in another embodiment of the present invention, the communication links 126 and 127 may comprise analogue communication links, for example communication links supported by a non-ISDN PSTN. Alternatively, the communication links 126 and 127 may comprise data links to a data concentrator, where the data concentrator is coupled to a PSTN via a high speed data link. The telephone subscriber unit 120 is coupled to the PTSN 105 via communication link 128 which may be a BRI, and the MMU 123 is coupled to the PSTN 105 via communication link 129 where the MMU 123 and the communication link 129 are described in an earlier patent application Ser. No. 08/305,538, now U.S. Pat. No. 5,509,053, titled "Method and Apparatus for routing a call to a mobile communication unit in a telepoint communication system", and is incorporated herein by reference. In one embodiment of the present invention the TCU 125 is a Silverlink 2000 personal telephone and the TBSs 110 and 115 are telepoint base stations, model numbers S35XGB1200BP or S35XGB1400BP or S35XGB1600BP, manufactured by Motorola Inc. The communication links 126,127,128 and 129 of the telepoint communication system 100 support a finite number of communication channels, and are a part of the limited number of communication resources of the telepoint communication system 100 that are shared by the subscribers of the telepoint communication system 100.

FIG. 1 also illustrates information packets communicated from the TCU 125 to the TBS 110 comprising a reservation request 130, a reservation confirmation 133 and a cancellation request 136, and information packets communicated from the TBS 110 to the TCU 125 comprising a confirmation 140, a reservation confirmation request 143, and a cancellation confirmation 146. The information packets are communicated between the TCU 110 and the TBS 125 over radio communication channels as is well known in the art.

Figure 2:
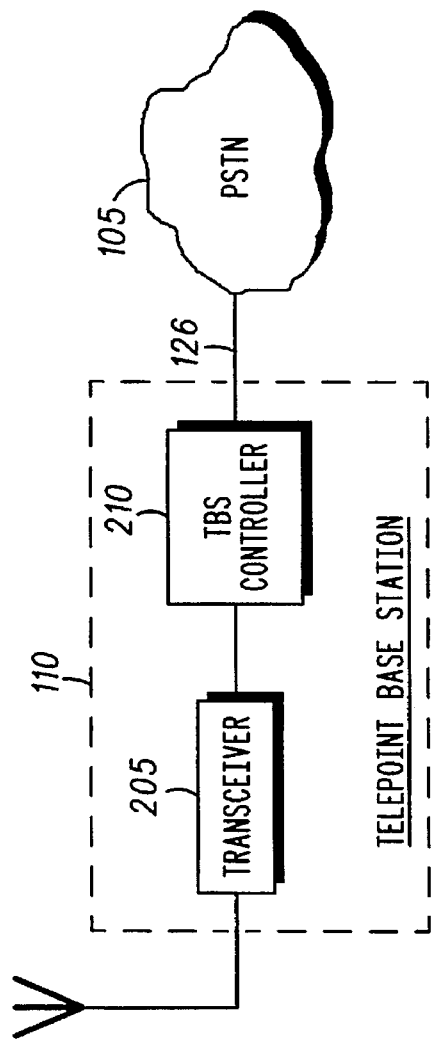
FIG. 2 illustrates a block diagram of a telepoint base station in the telepoint communication system in FIG. 1 in accordance with the preferred embodiment of the present invention.

FIG. 2 illustrates a block diagram of the TBS 110 comprising a transceiver 205 and a TBS controller 210. The transceiver 205 is coupled to and antenna and the TBS controller 210, and the transceiver 205 provides a two way radio communication channel between the TBS 110 and the TCU 125. The TBS controller 210 is also coupled to the communication link 126 which supports a limited number of communication channels, hence the communication link 126 provides a limited number of communication resources to the TBS 110. The TBS controller 210 comprises a microcontroller, a memory and a switching matrix, wherein the memory contains a program that determines the operation of the TBS 110. The TBS controller 210 also maintains the directory number of each communication channel of the communication link 126 and identifies which of the directory numbers is a party line. The directory numbers and the party line are assigned by the PSTN operator and is provided to the TBS controller 210 during the installation and configuration of the TBS 110.

Figure 3:
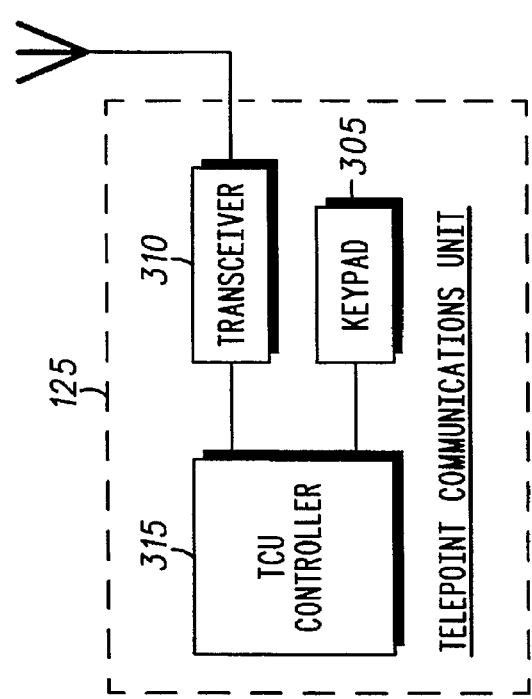
FIG. 3 illustrates a block diagram of a telepoint communication unit in the telepoint communication system in FIG. 1 in accordance with the preferred embodiment of the present invention.

FIG. 3 illustrates a block diagram of the TCU 125 comprising a keypad 305, a transceiver 310 and a TCU controller 315. The keypad 305 may have keys for inputting numeric and alphanumeric information, as well as keys for special functions. For example, a special function key may be provided on the keypad for inputting a reservation request. The keypad 305 is coupled to provide input to the TCU controller 315. The TCU controller 315 comprises an electronic microcontroller having a memory containing a software program which determines the operation of the TCU 125. The TCU controller 315 is coupled to receive input from the keypad 305, determine the functions that need to be performed in response to receiving the input from the keypad 305, and executing the functions in accordance with the software program. The transceiver 310 is coupled to an antenna and provides a radio communication channel between the TCU 125 and the TBS 110. The TCU 125 includes a personal identifier (PID) with each transmission via the transceiver 310, where the PID is a unique identifier assigned by the telepoint communication system operator enabling the TBS 110 to recognise transmissions from the TCU 125.

Hence, the present invention may be implemented in existing telepoint communication system by simply complementing the software capabilities of the existing telepoint communication system at the TBSs to include support for channel reservation services. Such an implementation would include having the TBS recognise transmissions of predetermined inputs on the keypad of the TCU as a channel reservation request, and in response, the TBS transmit information to the TCU which causes the TCU to provide an indication of the status of the channel request. It is anticipated that complementing the software at the TBSs on the telepoint communication system may be economically and quickly accomplished remotely, by transmission via the communication links of the telepoint communication system.

Figure 4:
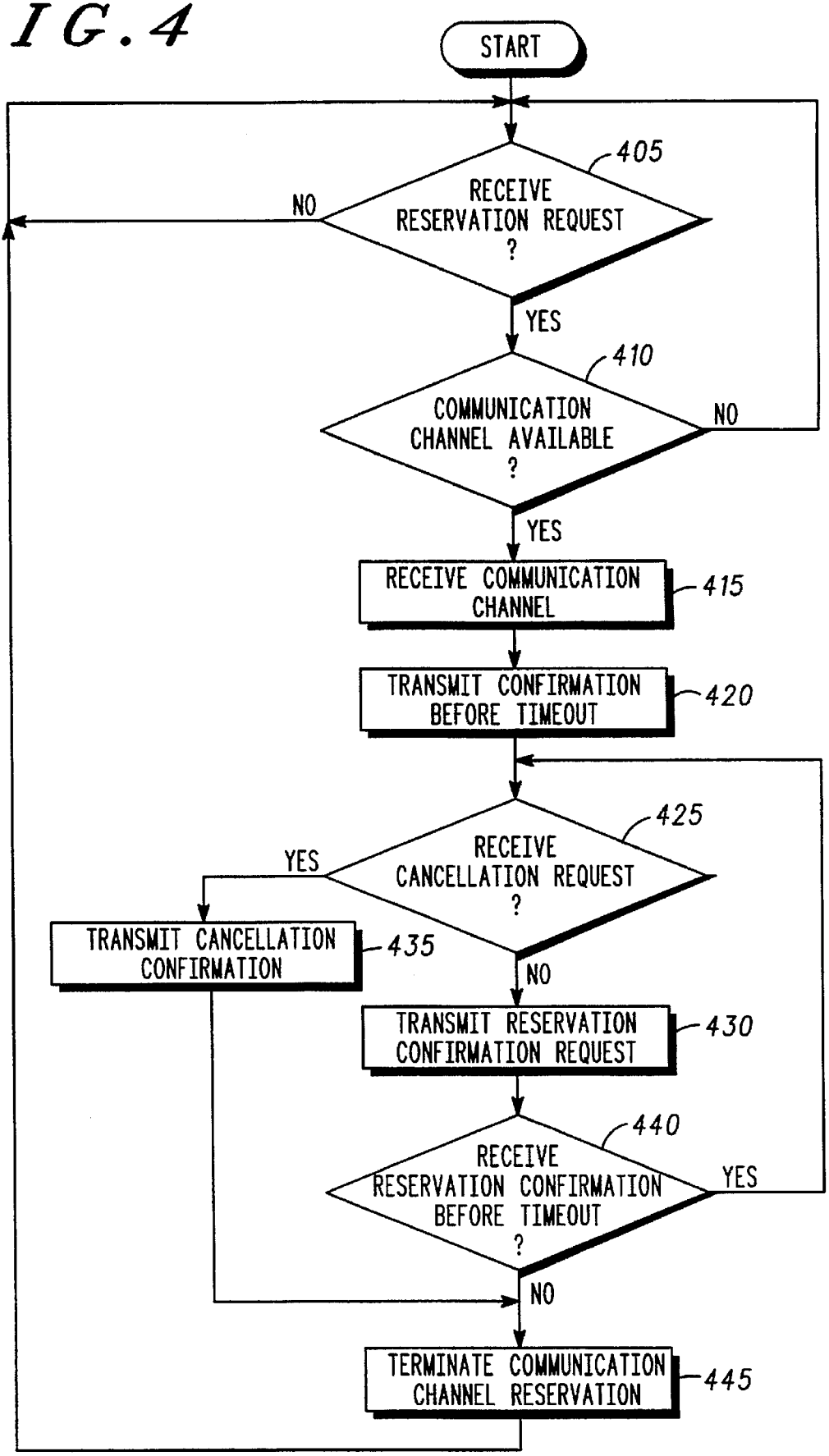
FIG. 4 illustrates a flowchart detailing the operation of the TBS in FIG. 2 in the telepoint communication system in FIG. 1 in accordance with the preferred embodiment of the present invention.

FIG. 4 illustrates a flow chart which details the operation of the TBS 110 or 155 that begins by determining receipt 405 of the reservation request 130 from the TCU 125. Prior to transmitting the reservation request 130, the TCU 125 must register with the TBS 110 for communications from the TCU 125 to be recognised by the TBS 110. Registering the TCU 125 with the TBS 110 enables the TBS 110 to receive the reservation request 130. In addition, registering the TCU with the TBS 110 informs the telepoint communication system 100, particularly the TBS 110, that the TCU 125 is within communicable range of the TBS 110 at the time of registration. Typically, the PID of the TCU 125 is communicated to the TBS 110 and the MMU 123 records the registration of the TCU 125 with the TBS 110, to allow an incoming call for the TCU 125 to be routed to the TCU 125 via the TBS 110. It is anticipated that in one embodiment of the present invention, the TCU 125 may reserve the communication channel of the TBS 110 or 115 during or shortly after, the TCU 125 registers with the TBS 110 and 115.

When the reservation request 130 is not received 405, the TBS 110 continues monitoring for receipt 405 of the reservation request 130. Similarly, when the reservation request 130 is received 405 and a communication channel on the communication link 126 is not available 410, the TBS 110 returns to monitoring receipt 405 of the reservation request 130. Alternatively, when the reservation request 130 is received 405, and a communication channel on the communication link 126 is available 410, then the communication channel is reserved 415. In one embodiment of the present invention, reserving the available communication channel comprises affiliating the PID of the requesting TCU 125 with the directory number of the available communication channel, and communicating the affiliation within the telepoint communication system 100, such that an incoming call received on the telepoint communication system 100 for the TCU 125, is routed by the telepoint communication system 100 via the reserved communication channel to the TCU 125. Alternatively, reserving a communication channel may require the TBS 110 to dynamically maintain the availability of at least one of the communication channels of the communication link 126, such that when an incoming call for the TCU 125 is received, the incoming call is routed via the available communication channel to the TCU 125. To determine whether a communication channel of the communication link 126 is available prior to reserving a communication channel, a determination is made whether the communication channels of the communication link 126 have been reserved. This may be accomplished by interrogating a database in a memory of the TBS controller 210, wherein the database provides a record of the status of each of the communication channels on the communication link 126. The status may comprise indications of availability for reservation and current activity, for example whether a communication channel is engaged in a call.

When a communication channel is not available for reservation, a further determination is made as to whether the communication channel is engaged in a call; and when the communication channel is not engaged in a call, the communication channel may then be reserved. In addition, a predetermined number of communication channels of the communication link 126 may not be available to support reservation services so as to ensure at least some of the communication channels of the communication link 126 are available for subscribers who do not subscribe to reservation services of communication channels on the telepoint communication system 100. When a communication channel is reserved 415, a confirmation is transmitted 420 to the TCU 125 within a predetermined timeout period in order to provide an indication to the TCU 125 that the reservation has been successful. Reserving the communication channel provides the TCU 125 with exclusive use of the reserved communication channel. When the TBS 110 has reserved 415 a communication channel for the TCU 125, the TBS 110 restricts utilisation of the reserved communication channel to the TCU 125, and in addition, routes outgoing calls from the TCU 125 through the reserved communication channel.

Having reserved a communication channel, the reservation remains unchanged until the cancellation request 136 is received 425 from the TCU 125, in response to which the cancellation confirmation 146 is transmitted 435 to the TCU 125, and communication channel reservation is terminated 445. After terminating the communication channel reservation, the TCU 125 returns to determining receipt 405 of the reservation request 130. The termination 445 ends the affiliation between the PID of the TCU 125 and the directory number of the communication channel, leaving the communication channel available for reservation. If the cancellation request 136 is not received 425, then the reservation confirmation request 143 is transmitted to the TCU 125. And, when the reservation confirmation 133 is received 440 from the TCU 125 within a predetermined time out period, the TBS 110 returns to determining whether the cancellation request 136 is received 425 and then continues operating as described above. The transmission 430 of the reservation confirmation request 143 to the TCU 125, and the receipt 440 of the reservation confirmation 133 from the TCU 125 allows the TBS 110 to determine whether the TCU 125 is within communicable range of the TBS 110. When the TCU 125 is not within communicable range, the quality of the radio communication channel between the TBS 110 and the TCU 125 deteriorates and the exchange of the reservation confirmation request 143 and the reservation confirmation 133 stops and times out, and the communication channel reservation is terminated 445. Hence, indefinite reservation of the communication channel by the TCU 125 when the TCU 125 is no longer able to utilise the reserved communication channel is prevented.

Transmitting 455 the cancellation confirmation 146 to the TCU 125 enables the TCU 125 to provide an indication to a TCU subscriber that the reservation cancellation has been successful. It is important to provide subscribers of a telepoint communication system with indications, for example, indications that inform a subscriber when a communication resource reservation is activated and de-activated, as well as periodic reminder indications when a communication resource reservation has been activated. These indications are important to a subscriber as it is envisaged that a telepoint communication system operator would levy a time base charge on a subscriber for reserving a communication resource, irrespective of whether the reserved communication resource is used during the period of reservation. It is also envisaged that the time base charge can include an escalating charge scale that would serve as a disincentive to discourage subscribers from hogging communication channels for long periods of time, thereby allowing more efficient use of the communication channels.

Hence, it is advantageous for a telepoint communication system to provide indications to the subscriber, thereby allowing the subscriber to effectively manage the cost of using the reservation services provided on a telepoint communication system by tracking the time when the reservation services are used.

Figure 5:
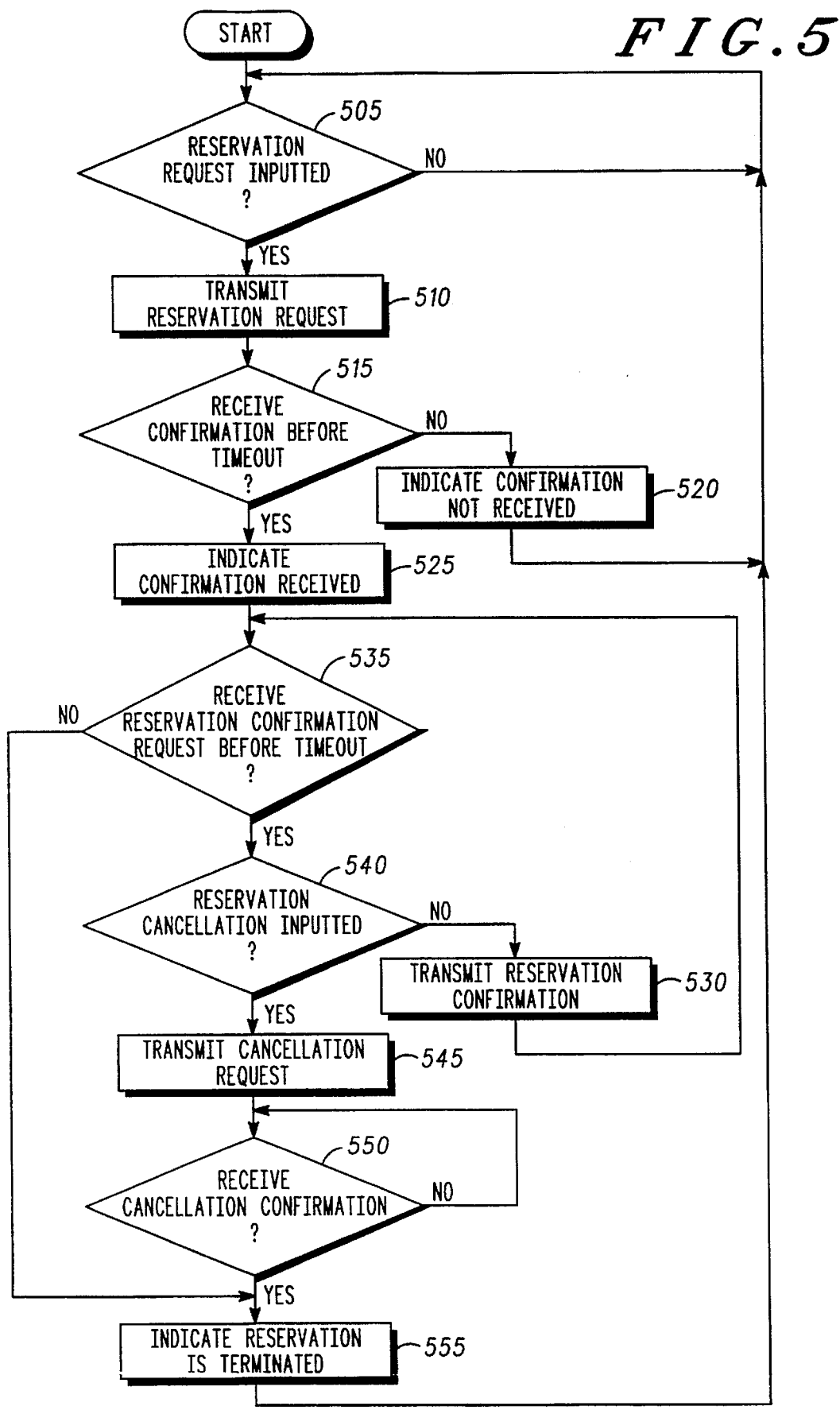
FIG. 5 illustrates a flowchart detailing the operation of the TCU in FIG. 3 in the telepoint communication system in FIG. 1 in accordance with the preferred embodiment of the present invention.

FIG. 5 illustrates a flow chart which details the operation of the TCU 125 that begins by monitoring when a reservation service request is inputted 505 by a subscriber via the keypad 305. When the reservation service request is inputted, the reservation request 130 is transmitted 510 to the TBS 110. As explained above the TBS 110 may respond by transmitting the confirmation 140 to the TCU 125. When the confirmation 140 is not received 515 by the TCU 125 before a predetermined timeout expires, an indication 520 is provided to the subscriber, signifying the confirmation 140 has not been received, and the TCU 125 returns to monitoring 505 when a reservation service request is inputted. Alternatively, when the confirmation 140 is received 515 before the predetermined time out expires, the TCU 125 provides an indication 525 to the subscriber signifying the confirmation 140 has been received. The indications provided by the TCU 125 to the subscriber may be provided with a variety of audio tones via an audio transducer that may be a part of the TCU controller 315. Alternatively, visual display indicators may be provided to the subscriber via a display unit that may be a part of the TCU controller 315. Subsequently, as explained above, the TBS 110 may transmit the reservation confirmation request 143 to the TCU 125 within a predetermined time out period. When the reservation confirmation request 143 is not received 535 within the predetermined time out, an indication is provided to the subscriber signifying the reservation is terminated, and the TCU 125 returns to monitoring 505 when a reservation service request is inputted. However, when the reservation confirmation request 143 is received 535 by the TCU 125 before expiry of the predetermined time out, a further determination is made whether a reservation cancellation is inputted 540 via the keypad 305. When the reservation cancellation is not inputted 540, the reservation confirmation 133 is transmitted 530 to the TBS 110, and the TCU 125 returns to determining whether the reservation confirmation request 143 has been received 535 before the expiry of the predetermined time out. Alternatively, when the reservation cancellation is inputted 540 via the keypad 305, the cancellation request 136 is transmitted 545 to the TBS 110, and the TCU 125 then awaits receipt 550 of the cancellation confirmation 146 from the TBS 110, prior to indicating 555 termination of the reservation to the subscriber.

In accordance with the present invention, the inbound call receiving capability in a telepoint communication system may be enhanced to provide channel reservation to telepoint subscribers, where a subscriber may reserve a communication channel at a telepoint base station to ensure receipt of important inbound calls. This is achieved by providing telepoint base stations the ability to manage the reservation of communication channels coupled to the telepoint base stations. In addition, with this invention no changes are required to mobile subscriber units to provide the added capability of reserving communication channels with existing telepoint communication units, hence, avoiding the expensive and troublesome task of recalling the existing telepoint communication units from the field for modifications at a service centre.

Hence, this invention provides a method that substantially improves the probability of a subscriber receiving incoming calls received on the telepoint communication system by allowing the subscriber to reserve communication resources at a telepoint base station, particularly when an incoming call is expected by the subscriber. In addition, this method can be quickly and economically implemented in current telepoint communication systems as changes are required to the telepoint base stations.

What is claimed is:

1. A method for coupling a cordless telephone second generation (CT-2) telepoint communication unit (TCU) to a CT-2 telepoint base station (TBS), wherein the CT-2 TBS is coupled to a public switched telephone network (PSTN) via a limited number of telephone lines, the method comprising the steps of:

a) generating and transmitting a signal from the TCU in response to user input;

b) receiving at the TBS the signal and determining whether the signal is a call request or a telephone line reservation request; and c) in response to receiving and determining the signal is a telephone line reservation request by the TBS, reserving at least one of the limited number of telephone lines, thereby providing the TCU exclusive use of the at least one of the limited number of telephone lines for incoming calls to the TCU.

2. The method of claim 1 wherein step (c) comprises the step of reserving the at least one of the limited number of telephone lines, thereby affiliating the at least one of the limited number of telephone lines with the TCU prior to coupling the at least one of the limited number of telephone lines with the TCU.

3. The method of claim 1 comprises the step of registering the TCU with the TBS prior to step (a).

4. The method of claim 1 wherein step (c) comprises the step of communicating the affiliation of the TCU with the at least one of the limited number of telephone lines within the PSTN, thereby enabling an incoming call received on the PSTN for the TCU to be routed via the at least one of the limited number of telephone lines to the TCU.

5. The method of claim 1 wherein step (c) comprises the step of determining the at least one of the limited number of telephone lines is available prior to reserving the at least one of the limited number of telephone lines.

6. The method of claim 1 comprising after step (c) the step of routing an outgoing call from the TCU via the at least one of the limited number of telephone lines to the PSTN.

7. The method of claim 1 comprising after step (c) the step of terminating the reservation of the at least one of the limited number of telephone lines by the TBS in response to determining the TCU is not within communicable range of the TBS.

8. The method of claim 1 comprising after step (c) the step of terminating the reservation of the at least one of the limited number of telephone lines by the TBS in response to receiving a reservation cancellation request from the TCU.

9. A telepoint base station (TBS) coupled to a public switched telephone network (PSTN) via a limited number of telephone lines of the PSTN for coupling to a telepoint communication unit (TCU), the TBS comprising:

a transceiver for communicating with the TCU; and a controller, coupled to the transceiver and coupled to the limited number of telephone lines, for receiving a signal from the TCU, for determining whether the received signal is a call request or a telephone line reservation request, and, in response to determining the signal is a telephone line reservation request, for reserving one of the limited number of telephone lines as a reserved telephone line, thereby providing the TCU with exclusive use of the reserved telephone line for incoming calls to the TCU.

10. A telepoint communication unit (TCU) for coupling to a telepoint base station (TBS), wherein the TBS is coupled to a public switched telephone network (PSTN) via a limited number of telephone lines, the TCU comprising:

a key pad for a user to input a reservation service request or a call request;

a transceiver for communicating with the TBS; and a controller, coupled to the key pad and the transceiver, for determining whether a call request or a reservation service request is received from the key pad and for transmitting a telephone line reservation request to the TBS via the transceiver in response to determining a reservation service request has been received from the key pad, thereby providing the TCU exclusive use of a reserved telephone line for incoming calls to the TCU, and for executing a call originating process in response to determining a call request has been received from the key pad.

11. The TCU of claim 10 comprising a presentation means coupled to the controller for providing a first indication to a user that a telephone line reservation request is successful in response to receiving a first input signal from the controller, wherein the controller transmits the first input signal to the presentation means in response to receiving a reservation confirmation from the TBS via the transceiver, and for providing a second indication, different from the first, to the user that the telephone line reservation request is not successful in response to receiving a second input signal from the controller, wherein the controller transmits the second input signal when the reservation confirmation is not received by the controller from the at least one TBS via the transceiver after a predetermined time.

\* \* \* \* \*